United States Patent Office 3,635,935
Patented Jan. 18, 1972

3,635,935
POLYMERIZATION OF ETHYLENE WITH SUPPORTED HYDROCARBON TITANIUM ACTIVATED WITH ALKYLALUMINUM
Wendell P. Long, Wilmington, Del., assignor to Hercules Incorporated, Wilmington, Del.
No Drawing. Filed Oct. 17, 1969, Ser. No. 867,356
Int. Cl. C08f 1/56, 3/06
U.S. Cl. 260—94.9
5 Claims

ABSTRACT OF THE DISCLOSURE

Ethylene is polymerized at a high rate and with high catalyst mileage by using as the catalyst a tetra(aralkyl)titanium, such as tetrabenzyltitanium, extended on a silica support and activated with an organoaluminum compound, preferably a dialkylaluminum chloride.

This invention relates to an improved process for the polymerization of ethylene using a solid supported catalyst.

It is well known that ethylene and 1-olefins generally can be polymerized at low pressure to high molecular weight solid polymers using as the catalyst a transition metal compound in combination with an aluminum alkyl; a particularly active combination being titanium trichloride with an aluminum alkyl. It is also known that ethylene can be polymerized in solid catalyst processes wherein molybdenum or chromium oxide is extended on a solid catalyst support as described in U.S. 2,691,647, 2,825,721, etc. Because titanium compounds are generally the most active transition metal compounds, attempts have been made to utilize them in a solid catalyst system. Thus, in U.S. 2,909,512 there is described a process wherein calcined titania is used in combination with titanium halide and an aluminum or alkali metal alkyl. U.S. 2,912,421 utilizes titania extended on a silica support as the catalyst in combination with an aluminum alkyl, the titania being prepared from a tetraalkyl titanate. However, the polymerization rates are low and the catalyst mileage, i.e., weight of polymer per gram of titanium, is too low to be practical.

Now in accordance with this invention, it has been discovered that ethylene can be polymerized at a high rate and with high catalyst mileage in a titanium solid catalyst system when there is used as the catalyst a tetra(aralkyl)titanium extended on a silica support and activated with an organoaluminum compound. This was most surprising since the tetra(aralkyl)titanium activated with the organoaluminum compound was a very poor catalyst system in the absence of the silica support.

The carrier material utilized for preparation of the catalyst can be any silica, alumina, silica-alumina, etc. particulate material which is activated by heat treatment as described in U.S. 2,825,721. Preferably, the carrier will be a non-porous, low bulk density silica. The heat-activated carrier is then rehydrated by treatment with water and after drying in an inert atmosphere, it is slurried in a hydrocarbon diluent, preferably the diluent to be used in the polymerization process, and a solution of the tetra(aralkyl)titanium is added.

It is believed that a reaction takes place between the tetra(aralkyl)titanium and the hydroxyls on the surface of the silica support to yield a product wherein the titanium is bonded through oxygen to silicon, e.g.,

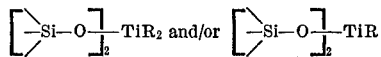

Whatever the structure of the product obtained when a tetra(aralkyl)titanium is contacted with the silica, a very active catalyst is obtained, when used in combination with an aluminum alkyl.

Any tetra(aralkyl)titanium can be used in the process of this invention. Exemplary of such titanium compounds are those having the general formula

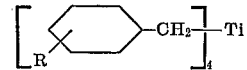

where R is H or an alkyl radical containing 1 to 10 carbon atoms, as for example, tetrabenzyltitanium, tetra(o, m, or p) tolyltitanium, tetra(ethylbenzyl)titanium, tetra(p-isopropylbenzyl)titanium, etc. The amount of the tetra(aralkyl)titanium added to the silica support can be from about 0.01 to about 0.4 mmole per gram of silica. The temperature at which the tetra(aralkyl)titanium compound and the silica are reacted can be from about −40° C. up to about 150° C., depending on the particular titanium compound being used. In some cases it is advantageous to heat-treat the titanium-on-silica catalyst. Such a treatment will generally be carried out at from about 50° C. to about 250° C., the length of time depending on the temperature. Thus, 5 minutes at the upper temperature might be adequate but at the lower temperature as much as 12 hours might be desired.

Any organoaluminum compound can be used as the activator for the polymerization process. Thus, any aluminum compound having the formula Al(R)₃ where at least one R is alkyl, alkenyl, cycloalkyl, aryl, arlkyl, or alkaryl and the other R's are the same or different or can be H, halogen, haloalkyl, or haloaryl, etc. Exemplary of such compounds are triethylaluminum, triisobutylaluminum, trihexylaluminum, trioctylaluminum, tridodecylaluminum, diisobutylaluminum hydride, isobutylaluminum dihydride, isoprenylaluminum, dihydride, isoprenylaluminum, ethylaluminum dichloride, diethylaluminum chloride, triphenylaluminum, tribenzylaluminum, etc., and mixtures of any of these compounds, as for example, ethylaluminum sesquichloride, the commercial mixture of triisobutylaluminum and diisobutylaluminum hydride, etc.

The amount of organoaluminum compound utilized in the process can be varied over a wide range but generally is a molar ratio of aluminum compound to titanium compound within the range of from 1:1 to 100:1, and preferably 10:1 to 40:1.

The polymerization can be carried out by any desired means which can be a batch or continuous process. Preferably, it will be carried out in the presence of a liquid diluent such as a liquid hydrocarbon which can be any aliphatic, cycloaliphatic or aromatic hydrocarbon free of ethylenic unsaturation. Exemplary of such solvents are pentane, hexane, heptane, isooctane, decane, cyclohexane, benzene, toluene, xylene, etc. A mixture of the ethylene and liquid hydrocarbon can be allowed to flow over a fixed catalyst bed or the ethylene can be passed into a suspension of the catalyst in the liquid hydrocarbon. In the latter case, the amount of the catalyst used can vary widely but generally will be about 0.05 to about 0.5 g. per 100 ml. of diluent.

The polymerization can be carried out at any temperature of from about 0° to about 120° C., preferably from about 20° to about 80° C., and more preferably about 40° to about 60° C., under a pressure of from subatmospheric to as high as 30 atm. or more.

The following examples illustrate the process of this invention. All parts and percentages are by weight unless otherwise indicated.

PREPARATION OF THE CATALYST

A commercial pyrogenic silica support having a surface area of from 150 to 380 square meters per gram was annealed at 750° C. for 70 hours in dry air and then was rehydrated with water at 100° C. overnight and dried at 130° C. under a stream of argon.

Example 3, the slurry of silica and tetrabenzyltitanium in n-heptane was heated for 1 hour at 100–110° C.

TABLE I

| Example | $(C_6H_5CH_2)_4$Ti:silica, mmole:gram | Molar ratio Al:Ti | Polymerization reaction conditions | | | Polyethylene yield | |
|---|---|---|---|---|---|---|---|
| | | | ° C. | P.s.i.g. | Min. | G./mmole Ti | Rate |
| Control A | 0.075 mmole Ti and no silica | None | 52 | 23 | 58 | 0.53 | |
| Control B | do | 13.3:1 | 52 | 20 | 50 | 10.7 | 10 |
| Control C | do | 13.3:1 | 52 | 18 | 62 | 40 | 32 |
| 1 | 0.072:1.0 | {None<br>{¹ 40:1 | 52 | 30 | 30<br>+78 | 0<br>247 | 95 |
| 2 | 0.072:1.0 | 26.5:1 | 52 | 30 | 111 | 535 | 145 |
| 3 | 0.072:1.0 ² | 26.5:1 | 52 | 30 | 1,320 | ³ 1,610 | 37 |

¹ Added after 30 minutes.
² Heat treated at 100–110° C. for 1 hour.
³ I.V. of 25.6.

A solution of tetrabenzyltitanium in n-heptane was added to the rehydrated silica in an amount to give the desired titanium to silica ratio.

POLYMERIZATION

The polymerizations were carried out in n-heptane as the diluent which was charged to the polymerization vessel by passing it through a column of 60–200 mesh silica gel directly into the capped vessel which was simultaneously being sparged with argon. The catalyst was then added. Generally, the amount of catalyst used was sufficient to provide 0.01 to 0.07 millimole of titanium per 100 ml. of the diluent. The polymerization vessel and contents were equilibrated at the reaction temperature, the activator was injected, and then ethylene was admitted to the given pressure. At the end of the polymerization, the vessel was vented and cooled. The polymer and solids were separated by filtration, washed with heptane and dried at room temperature for 16 hours. The yield of polymer was obtained by correcting for the weight of the catalyst support originally added.

EXAMPLES 1–3

These examples demonstrate the increase in the rate of polymerization, expressed as grams of polymer produced per millimole of titanium per atmosphere of ethylene per hour and the increase in catalyst mileage, i.e., grams of polymer per millimole of titanium, that is obtained when tetrabenzyltitanium is reacted with silica and activated with diethylaluminum chloride. In Table I are set forth the ratio of millimoles of tetrabenzyltitanium per gram of silica used in the polymerization, the millimoles of diethylaluminum chloride added, expressed as molar ratio of Al:Ti, the polymerization temperature and time, ethylene pressure and the yield of polyethylene expressed as grams per millimole of titanium together with the rate.

No silica was used in Controls A, B and C, with no activator in A, diethylaluminum chloride added in B, and in C the activator added after ethylene was introduced. In Example 1, the diethylaluminum chloride was added after 30 minutes with polymer formation occurring immediately after its addition, and in Examples 2 and 3 it was added prior to the introduction of ethylene. In Example 3, the slurry of silica and tetrabenzyltitanium in n-heptane was heated for 1 hour at 100–110° C.

EXAMPLES 4–5

The general procedure of Example 2 was repeated using triethylaluminum as the activator in Example 4 and diethylaluminum chloride in Example 5 in comparison with controls where no silica was used. The data for these runs are set forth in Table II.

TABLE II

| Example | $(C_6H_5CH_2)_4$Ti:silica, mmole:gram | Molar ratio Al:Ti | Polymerization reaction conditions | | | Polyethylene yield | |
|---|---|---|---|---|---|---|---|
| | | | ° C. | P.s.i.g. | Min. | G./mmole Ti | Rate |
| Triethylaluminum as activator | | | | | | | |
| Control | 0.075 mmole Ti and no silica | 13.3:1 | 52 | 23 | 58 | 3.6 | 2 |
| 4 | 0.054:1 | 18:1 | 50 | 31 | 1,020 | 187 | 5.0 |
| Diethylaluminum chloride as activator | | | | | | | |
| Control | 0.075 mmole Ti and no silica | 13.3:1 | 52 | 20 | 50 | 10.7 | 10 |
| 5 | 0.054:1 | 18:1 | 50 | 31 | 1,020 | 727 | 20.4 |

What I claim and desire to protect by Letters Patent is:

1. The process of polymerizing ethylene which comprises contacting ethylene with a catalyst comprising
   (a) a tetra(aralkyl)titanium extended on a silica support in a ratio of from about 0.01 to about 0.4 millimole of said titanium compound per gram of silica, and
   (b) an organoaluminum compound,
the molar ratio of the organoaluminum compound to the titanium compound being within the range of from about 1:1 to about 100:1.

2. The process of claim 1 wherein the tetra(aralkyl)-titanium is tetrabenzyltitanium.

3. The process of claim 2 wherein the organoaluminum compound is a dialkylaluminum chloride.

4. The process of claim 3 wherein the dialkylaluminum chloride is diethylaluminum chloride.

5. The process of claim 3 wherein the catalyst component (a) is heat-treated at from about 50° to about 250° C. prior to the polymerization process.

References Cited

UNITED STATES PATENTS

| 2,981,725 | 4/1961 | Luft et al. | 260—94.9 |
| 3,008,943 | 11/1961 | Guyer | 260—94.9 |

FOREIGN PATENTS

| 810,268 | 3/1959 | Great Britain. |

OTHER REFERENCES

Giannini et al.: Chemical Communications (August 1968) (16), page 940.

JOSEPH L. SCHOFER, Primary Examiner

E. J. SMITH, Assistant Examiner

U.S. Cl. X.R.

252—431